Patented May 13, 1924.

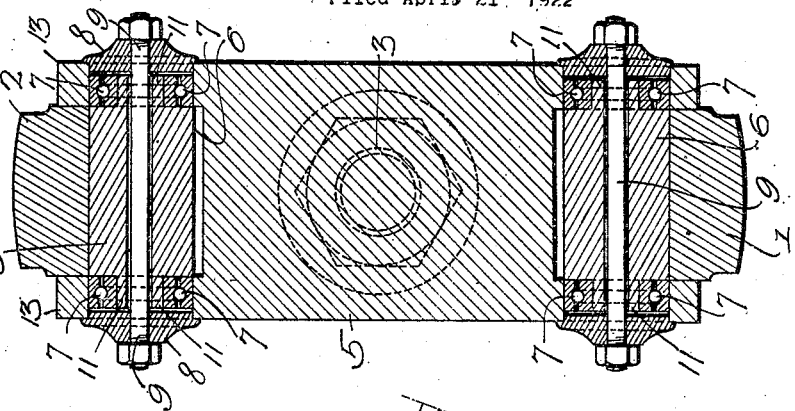
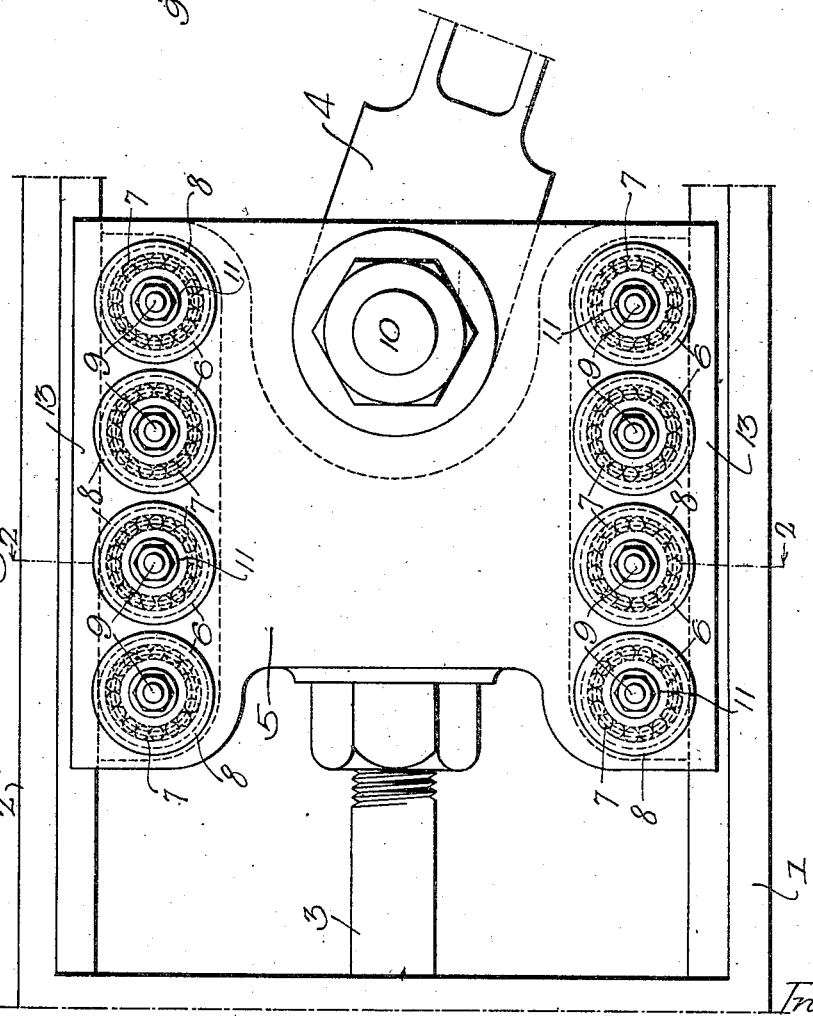

1,494,146

UNITED STATES PATENT OFFICE.

JAMES BOWEN, OF MANHEIM, PENNSYLVANIA, ASSIGNOR TO BOND FOUNDRY AND MACHINE COMPANY, OF MANHEIM, PENNSYLVANIA, A CORPORATION OF PENNSYLVANIA.

CROSSHEAD.

Application filed April 21, 1922. Serial No. 555,843.

*To all whom it may concern:*

Be it known that I, JAMES BOWEN, a citizen of the United States, residing in Manheim, Lancaster County, Pennsylvania, have invented Crossheads, of which the following is a specification.

One object of this invention is to provide a cross head for use in pumps, engines, or other mechanical devices, which shall include novel means for reducing to a low point the frictional resistance to its movement.

The invention more especially contemplates a novel form of anti-friction construction for interposition between the body of a cross head and the guide or guides with which it coacts.

These objects and other advantageous ends I attain as hereinafter set forth, reference being had to the accompanying drawings, in which, Fig. 1 is a side elevation of a cross head constructed in accordance with my invention, together with a pair of guides on which said cross head operates; and Fig. 2 is a transverse vertical section on the line 2—2, Fig. 1.

In the above drawings I have illustrated my invention as applied to a cross head 5 interposed between a piston rod 3 and a connecting rod 4 in the manner common in reciprocating engines, pumps, or the like. In the case shown, the piston rod is threaded into the body of the cross head and the connecting rod is pivotally connected to the latter by a pin 10. Obviously however, the elements 3 and 4 or their equivalents may be connected to the cross head body in other ways without affecting the vital features of my invention.

The top and bottom edges of the cross head are longitudinally recessed to provide ways for the reception of top and bottom guides 2 and 1 and within these recesses is also mounted a series of rollers 6, whose cylindrical surfaces are designed to engage and cooperate with the plane faces of said guides. Each roller at its ends has projecting neck portions 11 of reduced diameter extending into anti-friction bearings 7 which in turn are supported in suitable openings in the side flanges 13 of the cross head.

Each of these openings has a flanged cap 8 fitting into and closing it, for the purpose of confining the bearings 7 in place, and said caps are held in position by bolts 9 extending through them and through the rollers 6 with which they are associated respectively. Obviously the detail construction of the anti-friction bearings 7 may be widely varied without departing from my invention, which contemplates the use of any suitable form of anti-friction members in the side flanges of the cross head for rotatably supporting the rollers 6 so that these may turn with a minimum of friction.

Under conditions of use the weight of the cross head and its associated parts, as well as its upward or downward thrust against the guides, is borne by the rollers 6 which turn in their bearings as said cross head is reciprocated. The number and size of the rollers may be widely varied to suit different conditions of load, speed, etc., for which the mechanism is designed.

From the above description it will be appreciated that my invention may be applied with the utmost ease and convenience to a cross head and will result in its operation with a minimum of frictional resistance. Moreover by removing the bolt 9 from any roller, the caps 8 may be taken off to permit of access to or inspection of the bearings 7.

I claim:

The combination in a cross head of a body having side flanges defining a longitudinal channel and formed with aligned pairs of openings; anti-friction bearings in said openings; rollers mounted in the channel having portions of reduced diameter rotatably engaging said bearings and means for removably confining said bearings in place consisting of bolts extending through the rollers respectively; and caps held in place by said bolts.

JAMES BOWEN.